(12) United States Patent
Iwashiro

(10) Patent No.: US 6,680,812 B1
(45) Date of Patent: Jan. 20, 2004

(54) HEAD POSITIONING CONTROL SYSTEM USING SAMPLED DATA CONTROL SYSTEM FOR DISK DRIVE

(75) Inventor: Masafumi Iwashiro, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 458 days.

(21) Appl. No.: 09/661,467

(22) Filed: Sep. 13, 2000

(30) Foreign Application Priority Data

Nov. 10, 1999 (JP) ............................................. 11-320004

(51) Int. Cl.⁷ ............................................. G11B 5/596
(52) U.S. Cl. ........................ 360/78.06; 360/53; 360/75
(58) Field of Search ............................... 360/78.06, 77, 360/75, 53, 77.02, 61

(56) References Cited

U.S. PATENT DOCUMENTS 5,426,545 A * 6/1995 Sidman et al. ............ 360/78.09
5,847,527 A * 12/1998 Iwashiro ..................... 318/561
6,166,876 A * 12/2000 Liu .......................... 360/78.04
6,400,892 B1 * 6/2002 Smith ........................ 386/125

OTHER PUBLICATIONS

Proceedings of the 29th IEEE Conference on decision and Control; Wen-Wei Chiang; 1990, p. 1902–1907 "Multirate-State-Space digital Controller for Sector Servo systems".

Proceedings of the 1993 of Asia–Pacific Workshop on Advances in Motion control p. 189–205; Duc t. Phan; "The Design and Modeling of Multirate Digital Control Systems for Disk Drive Applications", 1993.

* cited by examiner

*Primary Examiner*—David Hudspeth
*Assistant Examiner*—Glenda Rodriguez
(74) *Attorney, Agent, or Firm*—Pillsbury Winthrop LLP

(57) ABSTRACT

A high-performance head positioning control system composed of a suitable combination of a multi-rate control system and a single-rate control system has been disclosed. An SM judging unit selects the multi-rate control system in a seek operation in which the head is moved to the desired track on the disk. When the head has come close to the desired track and changes from seek control to track following control, the SM judging unit switches from the multi-rate control system to the single-rate control system. The single-rate control system performs track following control whereby the head is positioned in the range of the desired track.

2 Claims, 8 Drawing Sheets

HEAD POSITIONING CONTROL SYSTEM USING SAMPLED DATA CONTROL SYSTEM FOR DISK DRIVE

CROSS-REFERENCE TO RELATED APPLICATIONS

This application is based upon and claims the benefit of priority from the prior Japanese Patent Application No. 11-320004, filed Nov. 10, 1999, the entire contents of which are incorporated herein by reference.

BACKGROUND OF THE INVENTION

This invention relates generally to a head positioning control system for a disk drive, and more particularly to a head positioning control system using a sampled data control system.

A conventional disk drive, such as a hard disk drive (HDD), has been provided with a head positioning control system (also referred to as a servo system) for positioning the head in the target position (or on the track to be accessed) on a disk serving as a data recording medium.

The head positioning control system is composed of a digital control system called a sampled data control system. The sampled data control system is a system that causes a controller (a discrete system) operating in discrete time to control a plant (an object of control) operating in continuous time. Specifically, the output (the state of the position or speed) of the plant is sampled (observed) at regular intervals of time (in a sampling period). In synchronization with the sampling period, the controller (actually, a CPU) calculates the control value (or the control input value for controlling the plant). In other words, the system switches control values according to the state of the plant observed by the controller in the sampling period, thereby driving the plant continuously.

In a HDD, the plant is an actuator including a head and a voice coil motor (VCM) and, in a narrow sense, corresponds to a VCM. The CPU calculates the position and travel speed of the head on the basis of the servo data read by the head from the disk. In HDD, the CPU performs seek control (also called speed control) whereby the head is moved to the target position (desired track) on the disk and track following control whereby the head is settled (kept) in the range of the desired track which the head has approached or reached.

The sampled data control systems are roughly divided into single-rate control systems and multi-rate control system. The single-rate control system is such that the sampling period coincides with the period in which the controller outputs the control value. In other words, the single-rate control system calculates one control value in a single sampling period and outputs the value to the plant. On the other hand, the multi-rate control system calculates control values in a single sampling period and switches between the control values.

FIG. 8 is a block diagram of a single-rate control system applied to seek control in head positioning control. The control system is provided with an observer 2 that has the function of observing the head position (HP) in a specific period (sampling period) on the basis of the output (position or speed) of the plant 1 and estimating the travel speed of the head at the time when the position was observed (or at the sampling time). In short, the observer 2 corresponds to an estimator that estimates the position or speed on the basis of the result of observing the state of the plant 1.

The difference between the target data (target position and target speed) from a reference input unit 4 and the result of observation (head position and travel speed) from the observer 2 is inputted to a controller 3. The controller 3 calculates the control value (u) by adding a correction value for correcting the difference and a specific input value (a type of compensation value) 5 and drives the plant 1 on the basis of the control value. The reference input unit 4 corresponds to an input section to which a state command is inputted in a feedback control system.

FIG. 9 is a block diagram of a multi-rate control system applied to the seek control. The control system is provided with an estimator model 6 that estimates the state (position and speed) of the plant 1 between sampling times, the times when the observer 2 makes observations. The estimator model 6 estimates the state (head position and travel speed) of the plant 1 between sampling times from the result (head position and travel speed) of the observations made by the observer 2 at sampling times. On the basis of the result of the estimation, the controller 3 calculates control values (u) in a single sampling period and switches between the control values at intervals of one sampling period, thereby performing driving control of the plant 1. Since such a multi-rate control system can perform finer control than the single-rate control system, it can perform seek control that responds faster to disturbance particularly affecting control in operation.

FIG. 10 shows a seek trajectory of the head in a single track range (with the track center, the target position, being 0) controlled by the head positioning control system. In FIG. 10, the characteristic when disturbance (for example, an impact) was applied temporarily to the system is shown. Specifically, in a seek trajectory 100 by the single-rate control system, the effect of disturbance cannot be absorbed and the amount of overshoot (the amount of shift in the head position) with respect to the target position (0) is large. In contrast, in a seek trajectory 101 by the multi-rate control system, response to disturbance is fast and therefore the amount of overshoot is relatively small.

After control has changed from the seek control performed up to the desired track to the track following control performed in the range of the desired track, the reference input unit 4 inputs the target position to the controller 3. The specific input value (5) is 0.

To the head positioning control system in a conventional HDD, a multi-rate control system particularly excellent in the performance of seek control has been applied. Since the multi-rate control system calculates control values in a single sampling period as described above, the amount of calculations done by the CPU are much larger than in the single-rate control system.

The estimation of the state (the estimation of position and speed) between sampling times depends on the accuracy of the estimator model 6. Thus, when the difference between the dynamic characteristic of the plant 1 and the result of estimation by the estimator model 6 is great, there is a strong possibility that the controller 3 will calculate an oscillatory control value. In addition, because in the multi-rate control system, the control values are switched in a shorter time than the sampling period (or has a shorter control period), when a large control value is encountered, the control input is more liable to be saturated than in the single-rate control system. The saturation of the control input means the upper limit of the control value set on the basis of the dynamic characteristic of the plant 1. Specifically, the control value calculated by the controller 2 has reached the upper limit.

Thus, when the control input is saturated, the system is impossible to control.

In short, the head positioning control system using only the multi-rate control system has the following problems: the amount of calculations done by the CPU increases, the estimation of states depends on the accuracy of the estimator model, and the control input tends to be saturated. Thus, taking into account the environment in which the HDD is used, the head positioning control system to which the multi-rate control system has been applied has an insufficient performance particularly in terms of stability.

BRIEF SUMMARY OF THE INVENTION

The object of the present invention is to provide a high-performance head positioning control system which has overcome the problems encountered in using only a multi-rate control system.

The head positioning control system of the present invention is so constructed that a multi-rate control system and a single-rate control system are combined suitably and that it switches between the multi-rate control system and the single-rate control system according to a specific condition in the control process.

Specifically, the system of the present invention, which is applicable to a disk drive, comprises actuator means for moving the head to a target position on a disk and positioning the head in the target position; observer means for observing the state of the position or travel speed of the head on the disk in a specific sampling period; single-rate control means for calculating, in synchronization with each sampling time in the sampling period, a control value for performing positioning control of the head in the target position on the disk on the basis of the result of observation by the observer means; multi-rate control means for estimating the state of the head between the sampling times in the sampling period on the basis of the result of observation by the observer means and calculating a plurality of control values in a single sampling period using the result of the estimation; and switching control means for switching between the single-rate control means and the multi-rate control means under the condition for the process of positioning the head in the target position and inputting the control value calculated by either the single-rate control means or the multi-rate control means to the actuator means.

In other words, the single-rate control system corresponds to a minimum multi-rate control system. In the single-rate control system, the plant observation period coincides with the period of the control input (the calculation period of the control value) or one control value is calculated through one head position observation.

The actuator means corresponds to an actuator mechanism including a head and a VCM. The observer means estimates and observes the position or travel speed of the head on the disk in the specific sampling period. In the disk drive, a CPU constituting the controller executes the single-rate control means, multi-rate control means, and switching control means.

With such a configuration, the present system uses the multi-rate control system in seek control whereby, for example, the head is moved to the target track, and changes the system to the single-rate control system when changing from the seek control to track following control. Specifically, the multi-rate control system excellent in response to disturbance causes the head to reach the target track at high speed. After the head has reached the target track, the system is changed to the single-rate control system with a small amount of calculations done by the CPU. Then, the single-rate control system performs the track following control. This not only realizes high-speed seek control but also decreases the load on the CPU in track following control, which improves the efficiency of the CPU in processing data except for servo control.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, an embodiment of the present invention will be explained.

Figure 1:
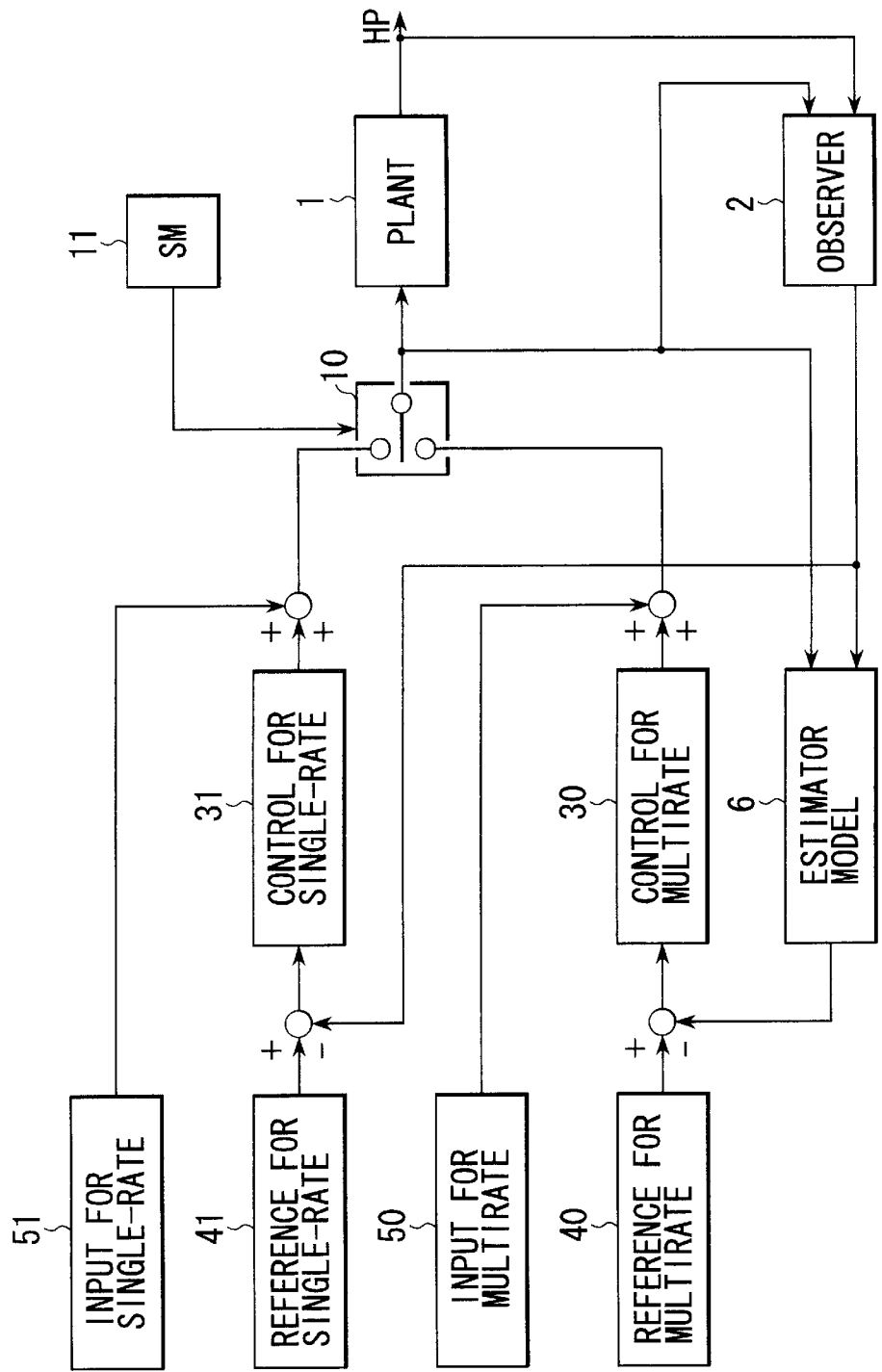
FIG. 1 is a block diagram showing the configuration of a head positioning control system related to an embodiment of the present invention.

FIG. 1 is a block diagram of a head positioning control system according to an embodiment of the present invention. The system is assumed to be applied to a disk drive shown in FIG. 2.

Configuration of Disk Drive

The disk drive is roughly divided into a disk 20 serving as a data recording medium, an actuator mechanism, and a control circuit system. The disk 20 is secured to a spindle motor 29 and rotates at high speed. On the disk 20, a large number of concentric tracks 20 have been formed. On each track 200, servo areas 201 in which servo data has been recorded are arranged at specific intervals in the direction of circumference. Each data area 202 is present between the servo areas 201.

The actuator mechanism is composed of an arm 22 equipped with a head 21 and a VCM (voice coil motor) 23 for driving the arm 22 in the direction of radius of the disk 20. The head positioning control system corresponds to a plant 1, an object to be controlled.

The control circuit system includes a read channel 24, a servo controller 25, a CPU 26, a ROM 27, and a VCM driver 28. The read channel 24 is a read/write signal processing circuit and has the function of reproducing servo data and user data from the read signal read by the head 21. The servo controller 25 senses the position of the head 21 (the track position and the position in the track range) from the servo data reproduced by the read channel 24.

The CPU (microprocessor) 26 and ROM 27 constitute the main controller of a disk driver. The ROM 27 stores the program and data necessary for the control operation of the CPU 26. The CPU 26 realizes the individual element, excluding the plant 1 in the head positioning control system in FIG. 1. The VCM driver 28 supplies a driving current for driving the VCM 23 of the actuator mechanism according to the control value calculated by the CPU 26.

Head Positioning Control System

The head positioning control system in the embodiment is so constructed that a multi-rate control system and a single-rate control system are combined as shown in FIG. 1. Specifically, the multi-rate control system includes an observer 2, an estimator model 6, a multi-rate controller (hereinafter, referred to as an M controller) 30, a multi-rate reference input unit 40, and a multi-rate specific compensation input unit 50. The multi-rate reference input unit 40 corresponds to an input section to which a state command is inputted in a feedback control system.

On the other hand, the single-rate control system includes the observer 2, a single-rate controller (hereinafter, referred to as an S controller) 31, a single-rate reference input unit 41, a single-rate specific compensation input unit 51.

The single-rate control system is such a system that the sampling period coincides with the output period of the control value by the controller. In other words, the single-rate control system calculates one control value in a single sampling period and outputs the value to the plant 1. On the other hand, the multi-rate control system is a control system that calculates control values in a single sampling period and switches between the control values.

The observer 2 observes the head position (HP) in a specific period (sampling period) on the basis of the output (position or speed) of the plant 1 and estimates the travel speed of the head at the time when the position was observed. The observer 2 corresponds to an estimator that estimates the position or speed on the basis of the result of observing the state of the plant 1.

The difference between the target data (target position and target speed) from the reference input unit 41 and the result of observation (head position and travel speed) from the observer 2 is inputted to the S controller 31. The S controller 31 calculates the control value (u) by adding a correction value for correcting the difference and a specific input value (a type of compensation value) 51 and drives the plant 1 on the basis of the control value.

In the multi-rate control system, the estimator model 6 estimates the state (position and speed) of the plant between sampling times, the times when the observer 2 makes observations. The estimator model 6 estimates the state (head position and travel speed) of the plant 1 between sampling times from the result (head position and travel speed) of observations made by the observer 2 at sampling times. On the basis of the result of the estimation, the M controller 30 calculates control values (u) in a single sampling period and switches between the control values at intervals of one sampling period, thereby performing driving control of the plant 1.

Furthermore, the present system includes a selector 10 for switching between the multi-rate control system and the single-rate control system, and a switching mode (SM) judging unit 11 for controlling the selector 10. The selector 10 and SM judging unit 11 are realized by the CPU 26. Under the control of the SM judging unit 11, the selector 10 selects one of the control value calculated by the M controller 30 and the control value calculated by the S controller 31 and inputs the result to the plant 1. The SM judging unit 11 controls the selector 10 according to a specific condition in the control process explained later to switch between the multi-rate control system and the single-rate control system.

Head Positioning Control Operation

Figure 2:
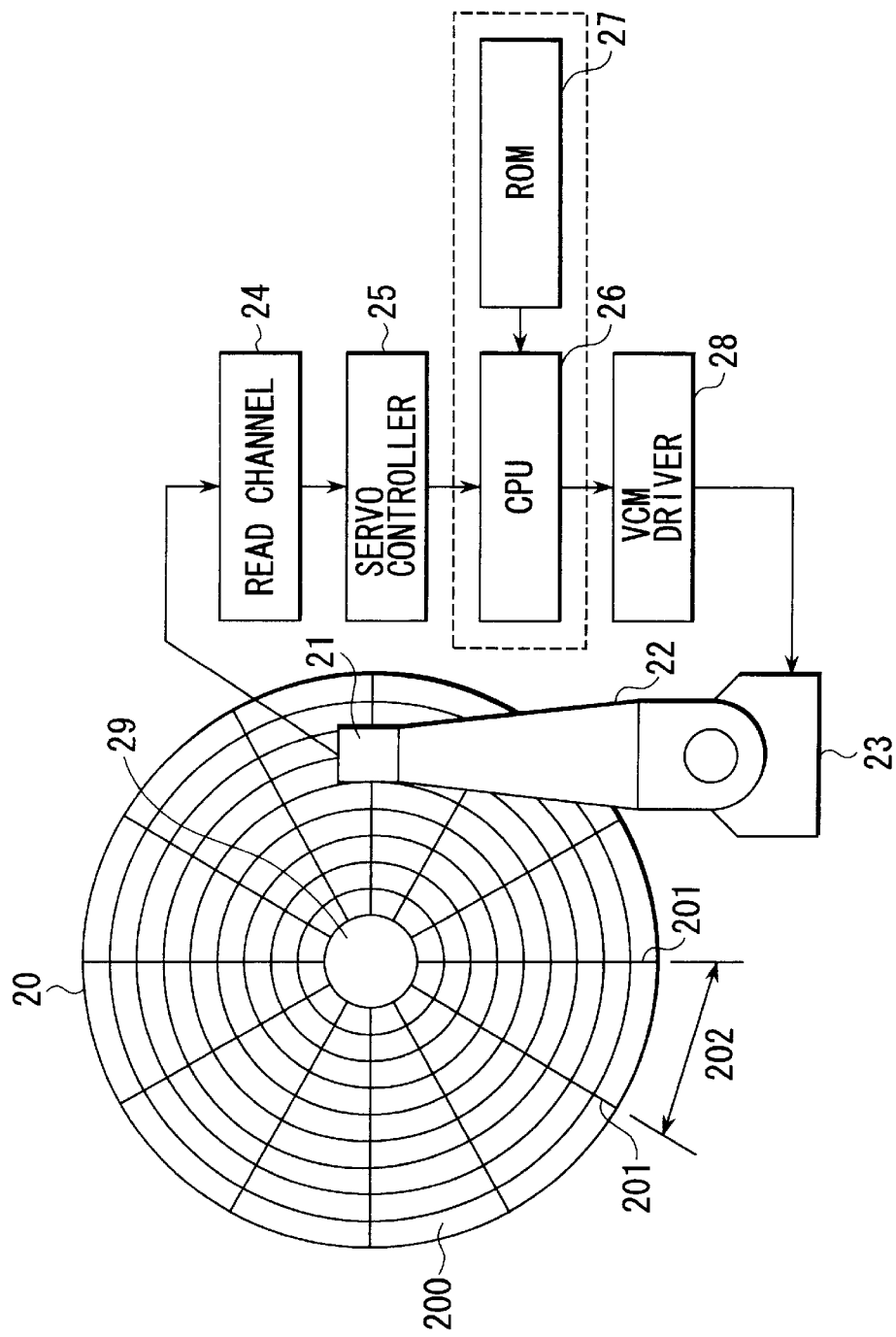
FIG. 2 is a block diagram showing the important part of a disk drive related to the embodiment.
Figure 3:
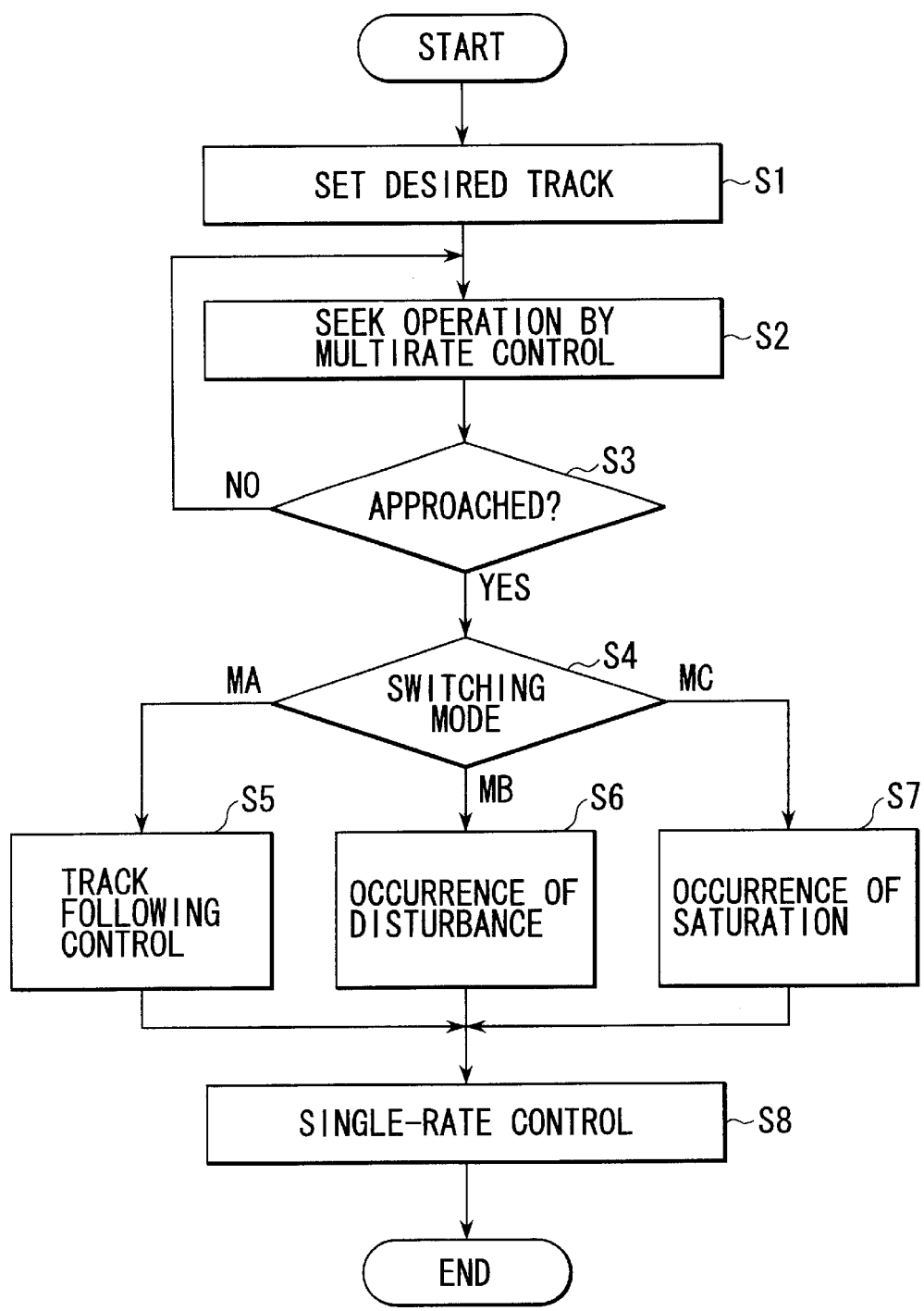
FIG. 3 is a flowchart to help explain the control operation of the control system related to the embodiment.

Hereinafter, the head positioning control operation of the embodiment will be described by reference to a flowchart in FIG. 3 as well as FIGS. 1 and 2.

If the position of the plant 1 (actually, the head) is p(t), the travel speed is v(t), and the state feedback (that is, the control value to be calculated) of the position p(t) of the plant 1 and the travel speed v(t) is u(t), the function of each of the controllers 30, 31 of the multi-rate control system and the single-rate control system is expressed by the following equation (1):

$$u(t) = [\, f_1 \quad f_2 \,] \begin{bmatrix} p(t) \\ v(t) \end{bmatrix} \quad (1)$$

where f1 and f2 are constants.

Since each of the controllers 30, 31 has no internal variable, no transient response occurs when the switching between the multi-rate control system and the single-rate control system is done. An ordinary controller with an internal variable is expressed by the following equation (2):

$$\left. \begin{array}{l} x(k+1) = Ax(k) + Bu(k) \\ y(k) = Cx(k) + Du(k) \end{array} \right\} \quad (2)$$

With such a controller, because transient response takes place, depending on the state of internal variable x(k), when the switching between the multi-rate control system and the single-rate control system is done, there is a possibility that the seek trajectory of the head will deteriorate.

The estimation observer 2 is constructed as an ordinary minimum dimension observer and expressed by the following equation (3):

$$\left. \begin{array}{l} \hat{x}(k+1) = \hat{A}\hat{x}(k) + \hat{B}p(k) + \hat{J}u(k) \\ v(k) = \hat{C}\hat{x}(k) + \hat{D}p(k) \end{array} \right\} \quad (3)$$

If the control value u(k+ik/r) between sampling times is estimated using the position p(k) and estimated speed v(k) at a sampling time as initial values, the estimator model 6 that estimates the state at intervals of time at which the sampling time is divided into r equal parts is expressed by the following equation (4):

$$\begin{bmatrix} p(k+(i+1)k/r) \\ v(k+(i+1)k/r) \end{bmatrix} = A_r \begin{bmatrix} p(k+ik/r) \\ v(k+ik/r) \end{bmatrix} + B_r u(k+ik/r) \quad (4)$$

$$i = 0 \ldots r-1$$

where each of Ar and Br is obtained by converting a model to be controlled in a continuous time system into a discrete set in a control input period (or the control value switching period). The single-rate reference input unit 41 and specific compensation input unit 51 are such that time-sequence data about the positions, speeds, and specific inputs (compensation values) serving as targets during sampling are tabulated. The single-rate control system refers to the table in each control input period, starting from the time when the seek operation of the head starts.

On the other hand, the multi-rate reference input unit 40 and specific compensation input unit 50 are such that time-sequence data about the positions, speeds, and specific inputs (compensation values) between sampling times as well as the time-sequence data during sampling are tabulated. The multi-rate control system refers to the table in each control input period, starting from the time when the seek operation of the head starts.

Hereinafter, a concrete operation when the head positioning control system is applied to the head positioning control of the disk drive will be explained by reference to a flowchart in FIG. 3.

In the disk drive, the desired track (target position), the object to be accessed, on the disk 20 is set according to the command from the host system (step S1). The CPU 26 starts to perform control so as to position the head on the desired track. The CPU 26 normally performs seek control until the head has reached the desired track or its vicinity and thereafter changes from the seek control to track following control to position the head in the range of the desired track (normally, the track center).

The CPU 26 causes the multi-rate control system to perform seek control (step S2). Thus, as shown in FIG. 1, the SM judging unit 11 causes the selector 10 to switch to the M controller 30 side in the multi-rate control system. Specifically, the M controller 30 calculates the control value for multi-rate control and inputs the value to the plant 1. This performs multi-rate control of the actuator mechanism acting as the plant 1, which moves the head 21 toward the desired track at the target speed.

At the time when the head 21 has reached the desired track, the SM judging unit 11 (the element of the CPU 26) judges that control should be changed from seek control to track following control and causes the selector 10 to switch to the single-rate control system side (YES in step S3 and S4).

The SM judging unit 11 has the following three switching modes (assumed to be MA, MB, and MC for convenience's sake) under the condition for the control process and causes the selector 10 to switch from the multi-rate control system to the single-rate control system (step S5 to step S8).

The switching mode (MA) is executed under the condition for the control process that control is changed from seek control to track following control (steps S5 and S8). Specifically, when the head 21 has come close to a specific range from the desired track, the control value calculated by the M controller 30 has become small sufficiently (the specific input value is 0), and control has been changed to track following control, the CPU 26 switches to the single-rate control system. That is, the CPU 26 causes the single-rate control system to perform track following control that settles the head 21 in the range of the desired track.

Figure 4A:
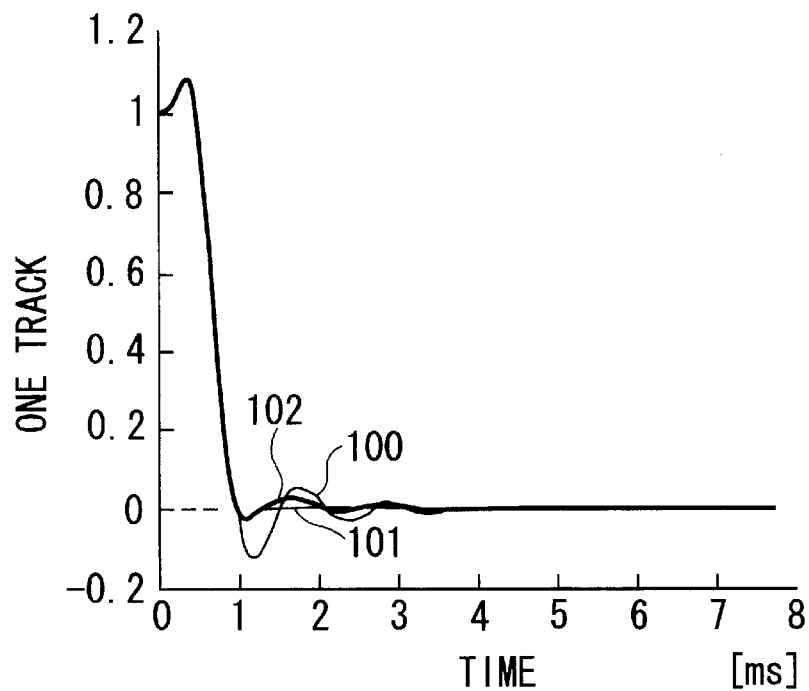
FIGS. 4A, 5A, and 6A show characteristics of the seek trajectories in the control switching mode related to the embodiment.
Figure 4B:
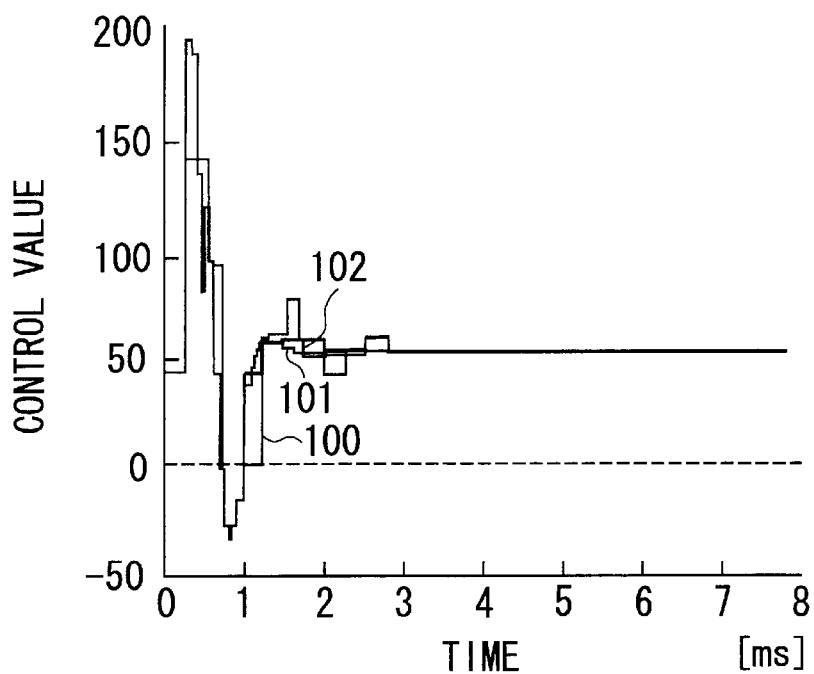
FIGS. 4B, 5B, and 6B show characteristics of the control values in the control switching mode related to the embodiment.

FIG. 4A shows a seek trajectory (100) by the single-rate control system, a seek trajectory (101) by the multi-rate control system, and a seek trajectory (102) by the switching mode (MA) in one track range (with the center, the target position, being 0). In FIG. 4A, a characteristic when temporary disturbance was applied is shown. FIG. 4B shows changes in the control value in the control system corresponding to each seek trajectory.

As seen from FIG. 4A, the amount of overshoot with respect to the target position (0) is large on the seek trajectory (100) only by the single-rate control system. Since the seek trajectory (101) only by the multi-rate control system has fast response to disturbance, the amount of overshoot with respect to the target position (0) is relatively small. The multi-rate control system, however, has a disadvantage in that the amount of calculations done by the CPU 26 increases.

To overcome the disadvantage, switching from the multi-rate control system to the single-rate control system produces a seek trajectory (102) that has suppressed the amount of overshoot due to disturbance remarkably. In track following control, the CPU 26 operates the single-rate control system with a relatively small amount of calculations, which increases the efficiency of the CPU 26 in data processing excluding track following control. The data processing excluding track following control includes control of the data read/write operations.

The switching mode (MB) is a mode that switches to the single-rate control system under the condition for the control process that an oscillatory control input (the calculation of oscillatory control value) has occurred during the control operation by the multi-rate control system (steps S6, S8).

Specifically, after the multi-rate specific value (50) has become 0, the SM judging unit 11 causes the selector 10 to switch to the single-rate control system, when the difference between the control value u(k) and the control value u(k−1) at the preceding sampling has exceeded a specific value udiff, that is, when the following conditional expression (5) has been satisfied:

$$|u(k)-u(k-1)| > u\text{diff} \quad (5)$$

Figure 5A:
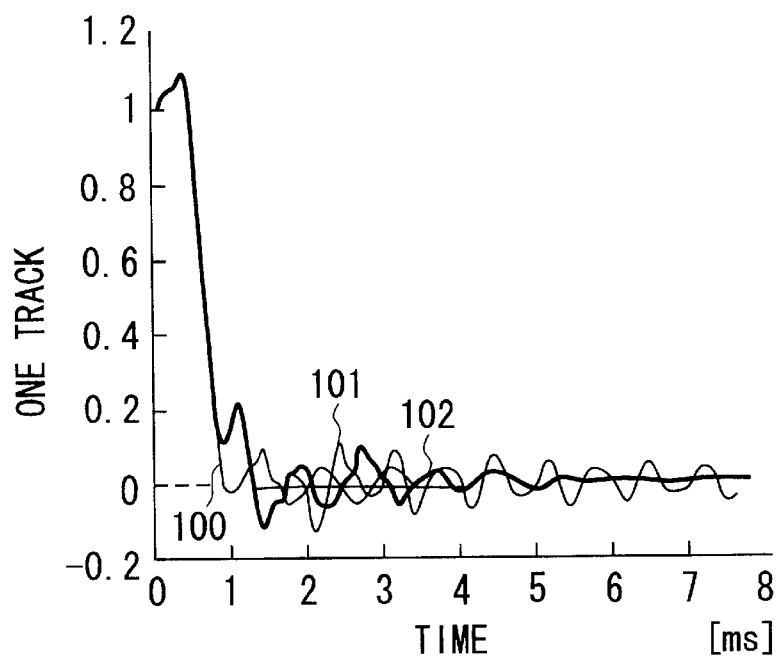
Figure 5B:
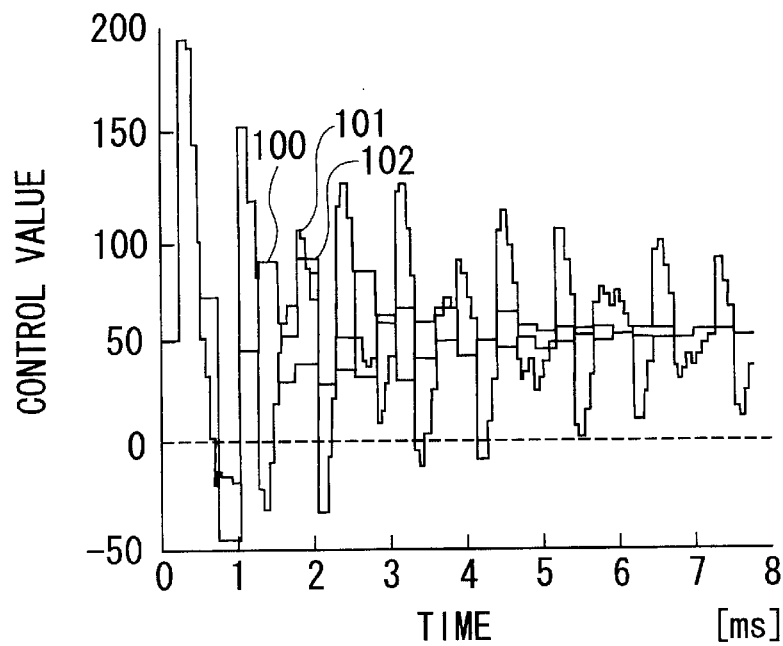

In the multi-rate control system, the estimated values (positions and speeds) of the state of the plant 1 between sampling times depend on the accuracy of the estimator model 6. Thus, when there is a difference between the dynamic characteristic (e.g., the temperature characteristic of the VCM) of the estimator model 6 and that of the plant 1, an oscillatory control might take place. Specifically, where there is a high-order oscillation of higher frequency than the sampling period in the plant 1, oscillation is excited, depending on the control input period as shown by the seek trajectory (101) of FIG. 5A and the head positioning accuracy might decrease when control is changed to track following control. FIG. 5B shows changes in the control value in the control system corresponding to each of the seek trajectories corresponding to the seek trajectories (100, 101, 103).

When the switching mode (MB) is used to switch from the multi-rate control system to the single-rate control system, the occurrence of oscillatory control inputs accounting for the characteristic of the multi-rate control system can be suppressed (see FIG. 5B). As shown in FIG. 5A, the amount of positional error is suppressed more on the seek trajectory (102) by the switching mode (MB) than that on the seek trajectory (101) only by the multi-rate control system.

Namely, in the course of changing seek control to track following control, switching from the multi-rate control system to the single-rate control system enables head position errors between sampling times to be suppressed. Consequently, the head positioning accuracy is improved relatively, which decreases the read error rate in reading the data from, for example, the desired track with the head. In the head positioning system, since the occurrence of oscillatory control inputs is a factor that makes noise in the seek operation, the suppression of the head positioning error produces the effect of suppressing the noise.

The switching mode (MC) is a mode that switches to the single-rate control system under the condition for the control process that the saturation of the control input has occurred during the control operation by the multi-rate control system (steps S7, S8). The saturation of the control input means the upper limit of the control value set on the basis of the dynamic characteristic of the plant 1. That is, when the control value calculated by the controller 2 has reached the upper limit and the control input gets saturated, the system is impossible to control.

Specifically, when the absolute values of all the multi-rate control values u(k+ik/r) at the sampling time k have exceeded the input upper limit umax, or when the following conditional expression (6) has been satisfied, the SM judging unit 11 causes the selector 10 to switch to the single-rate control system:

$$|u(k+ik/r)| > u_{max_{i=0\ldots r-1}} \quad (6)$$

Figure 6A:
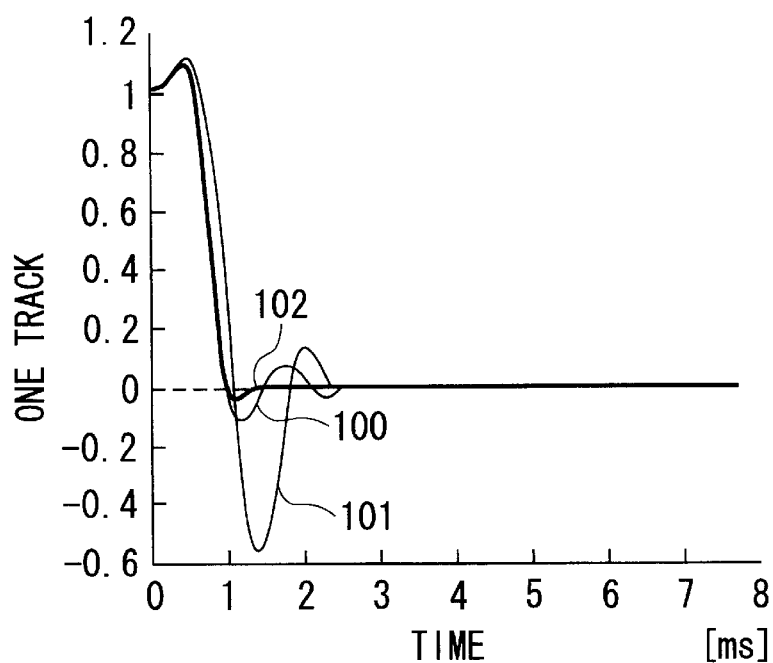
Figure 6B:
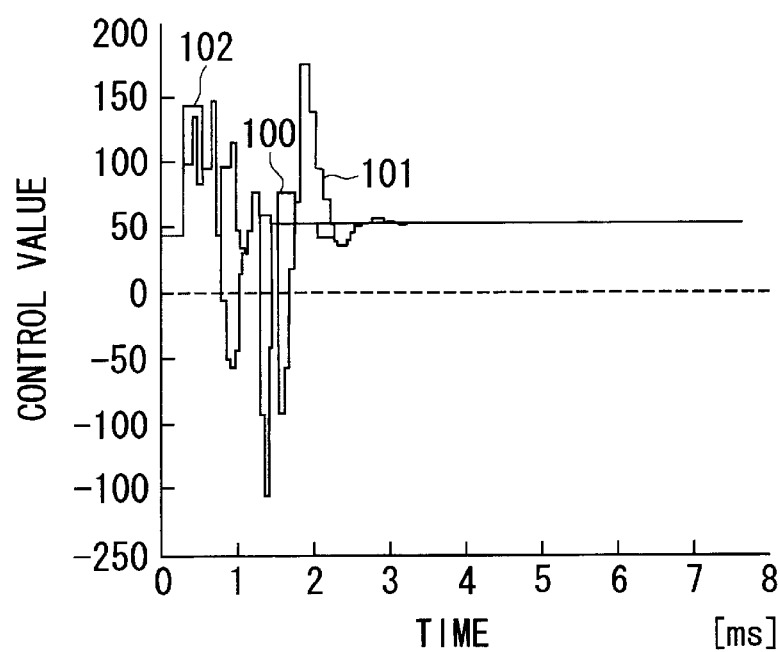

Because the multi-rate control system performs control in a shorter time than the sampling period, it is more liable to permit a larger control value to occur than the single-rate control system. FIG. 6B shows changes in the control value corresponding to the seek trajectory (100) by the single-rate control system and the seek trajectory (101) by the multi-rate control system shown in FIG. 6A.

As seen from FIG. 6B, the input is more liable to be saturated in the multi-rate control system. Because the saturation of the input is not reflected in the estimator model 6 for the multi-rate control system, there is a possibility that an erroneous estimation will be made. Thus, as shown in FIG. 6A, the seek trajectory 101 by the multi-rate control system might have great overshoot.

To overcome this drawback, the switching mode (MC) is used to switch from the multi-rate control system to the single-rate control system, thereby avoiding the occurrence of the saturation of the input particularly in track following control. As shown in FIG. 6A, the seek trajectory 102 where the amount of overshoot has been suppressed can be realized. When the input is not saturated, the SM judging unit 11 may cause the selector 10 to switch from the single-rate control system to the multi-rate control system again. In this case, the high-speed seek operation can be continued with the characteristic of the multi-rate control system.

Modification

Figure 7:
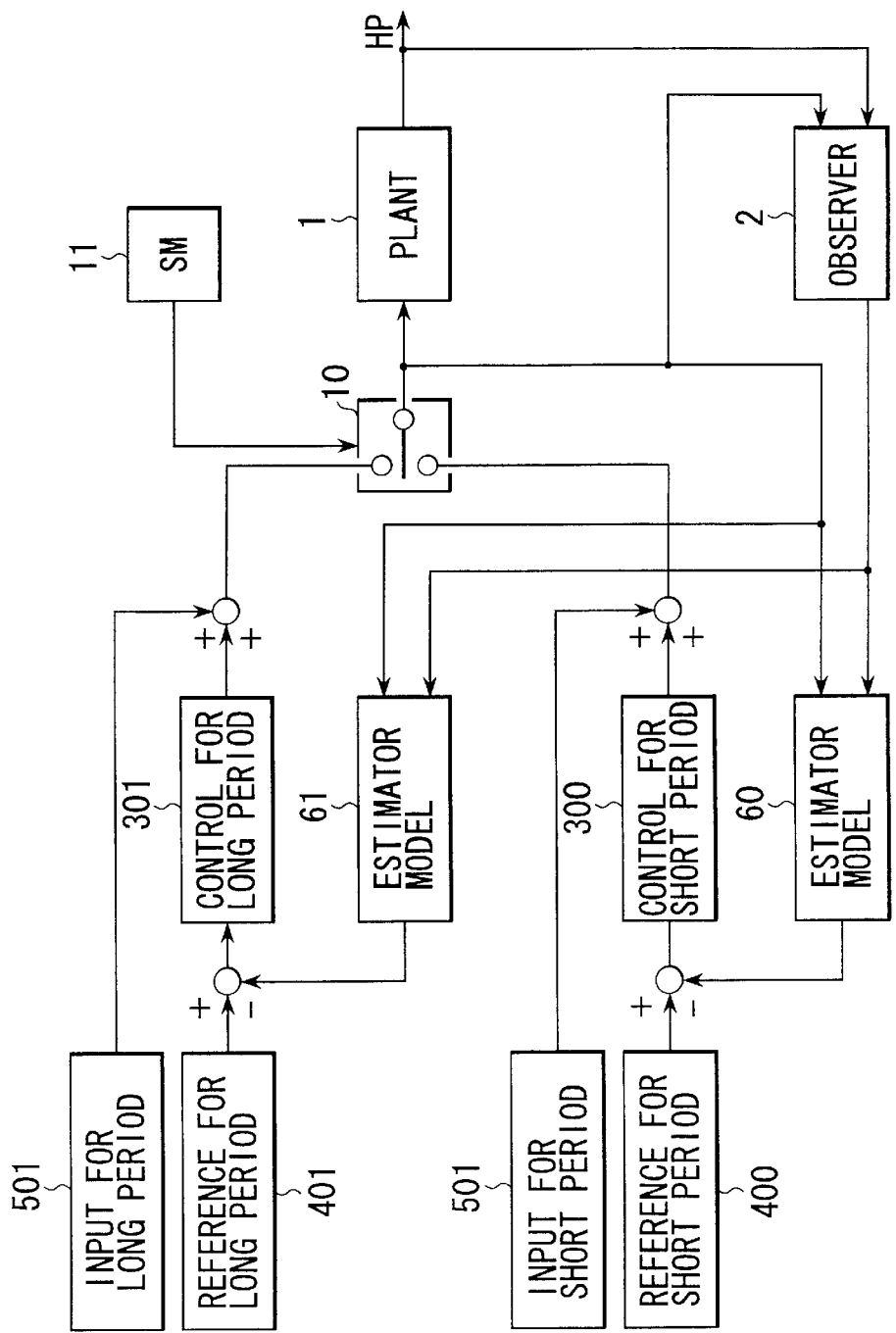
FIG. 7 is a block diagram related to a modification of the embodiment.
Figure 8:
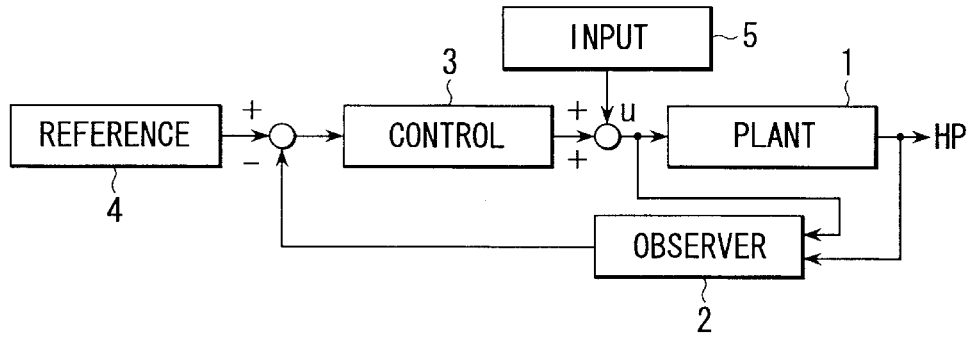
FIG. 8 is a block diagram of a conventional single-rate control system.
Figure 9:
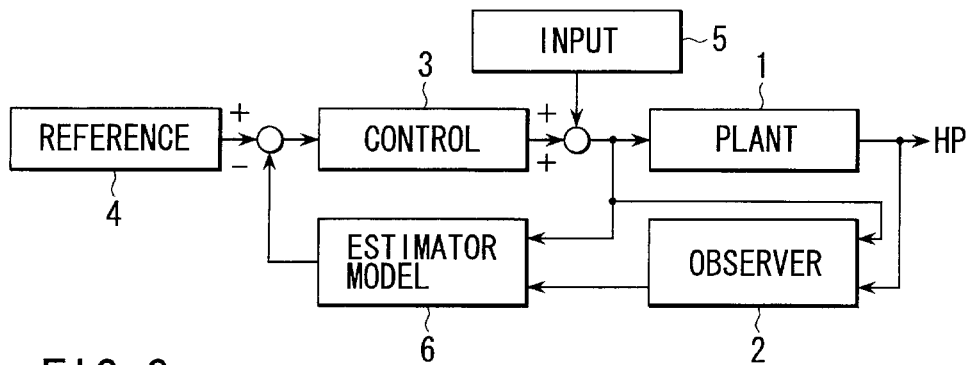
FIG. 9 is a block diagram of a conventional multi-rate control system.
Figure 10:
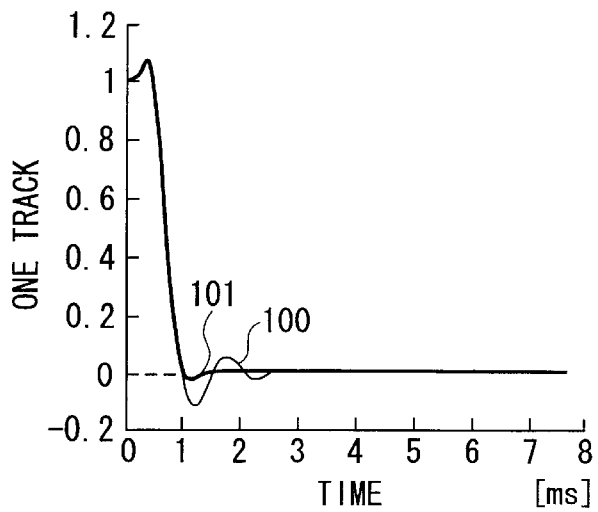
FIG. 10 shows a seek characteristic in a conventional head positioning control system.

FIG. 7 is a block diagram of a head positioning control system related to a modification of the embodiment.

As described above, the system of the embodiment is such that the single-rate control system and the multi-rate control system are combined and the SM judging unit 11 causes the selector 10 to switch between the single-rate control system and the multi-rate control system.

The single-rate control system corresponds to the mode in which a control value is obtained through just one calculation in a single sampling period. Therefore, the single-rate control system can be treated as a multi-rate control system with a relatively long control input period (long period mode). Consequently, the whole system can be constructed only of a multi-rate control system as a modification of the embodiment.

Specifically, the system of the modification is such that a long-period mode (long control input period) system and a short-period mode (short control input period) system are combined in a multi-rate control system and the SM judging unit 11 causes the selector 10 to switch between the long-period mode system and the short-period mode system. The long-period mode system includes a long-period estimator model unit 61, a long-period controller 301, a long-period reference input unit 401, and a long-period specific input unit 501. On the other hand, the short-period mode system includes a short-period estimator model unit 60, a short-period controller 300, a short-period reference input unit 400 and a short-period specific input unit 500.

As in the embodiment, the SM judging unit 11 executes three switching modes (MA, MB, and MC) under the condition for the control process and causes the selector 10 to switch between the short-period mode system and the long-period mode system. For example, in the switching mode (MA), the short-period mode system is caused to function in seek control, whereas the system is switched to the long-period mode system when control is changed to track following control.

As explained above in detail, with the present invention, the multi-rate control system and the single-rate control system are combined suitably in the head positioning control system applied to a disk drive and the switching between these two systems is effected according to the condition in a specific control process. Consequently, this enables the multi-rate control system to overcome the following problems: the amount of calculations done by the CPU increases, the estimation of states depends on the accuracy of the estimator model, and the control input tends to be saturated. As a result, it is possible to provide a high-performance head positioning control system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A head positioning control system for a disk drive including a disk and a head, comprising:

actuator means for moving said head to a target position on said disk and positioning said head in the target position;

observer means for observing the state of the position or travel speed of said head on said disk in a specific sampling period;

single-rate control means for calculating, in synchronization with each sampling time in said sampling period, a control value for performing positioning control of said head in the target position on said disk on the basis of the result of observation by said observer means;

multi-rate control means for estimating the state of said head between the sampling times in said sampling period on the basis of the result of observation by said the observer means and calculating a plurality of control values in a single sampling period using the result of the estimation; and switching control means for performing control in such a manner that it selects the control value from said multi-rate control means at the beginning of control, inputs the value to said actuator means, and moves said head to said target position, and switching from the control value from said multi-rate control means to the control value from said single rate control means and inputting the new value to said actuator means when said multi-rate means has calculated an oscillatory value.

2. A head positioning control method for a disk drive including a disk, a head, and an actuator, comprising:

observing the state of the position or travel speed of said head on said disk in a specific sampling period when said actuator moves said head to a target position on said disk and positions the head in the target position;

executing a single-rate control mode in which a control value for performing positioning control of said head in the target position on said disk on the basis of the result of observation by said observer means is calculated in synchronization with each sampling time in said sampling period;

executing a multi-rate control mode in which the state of said head between the sampling times in said sampling period is estimated on the basis of the result of observation by said the observer means and a plurality of control values are calculated in a single sampling period using the result of the estimation; and executing a switching mode selecting the control value in said multi-rate control mode at the beginning of control and controlling said actuator, and switching from the control value in said multi-rate control mode to the control value in said single-rate control mode and controlling said actuator when an oscillatory control value has been calculated in said multi-rate control mode.

* * * * *